March 30, 1965     E. U. SOWERS III     3,175,569
PURE FLUID PULSE GENERATOR
Filed Dec. 28, 1961
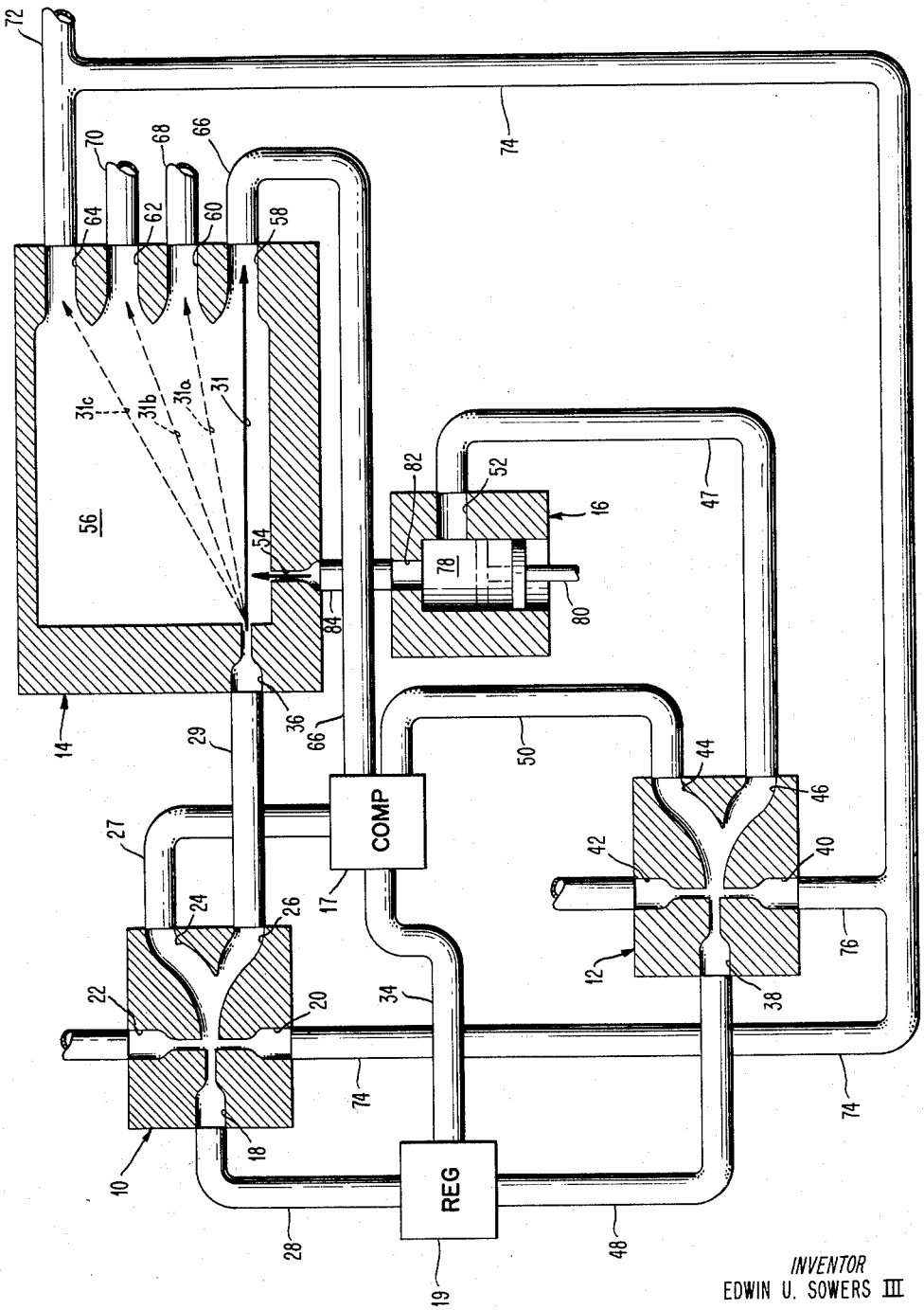
INVENTOR
EDWIN U. SOWERS III
BY *Edward M. Farrell*
ATTORNEY

United States Patent Office 3,175,569
Patented Mar. 30, 1965

3,175,569
PURE FLUID PULSE GENERATOR
Edwin U. Sowers III, Philadelphia, Pa., assignor to Sperry Rand Corporation, New York, N.Y., a corporation of Delaware
Filed Dec. 28, 1961, Ser. No. 162,775
12 Claims. (Cl. 137—81.5)

The invention relates to pulse generating systems and more particularly to a system for generating fluid pulses of variable duration and frequency.

Since the fluid amplifier has proven itself to be readily adaptable to digital techniques, data processing devices have been developed wherein the processing functions are carried out in conformance with fluid principles. Whereas electrical digital processing equipment utilizes electrical pulse generators, fluid operated equipment requires fluid pulse sources.

It is therefore an object of the invention to provide means operating on fluid principles to produce fluid signal pulses.

It is a further object of the invention to provide means adapted to produce fluid pulses of variable time duration.

It is a still further object of the invention to provide means adapted to produce fluid pulses at a variable repetition rate.

According to the invention, means are provided to cause a power fluid stream to traverse an enclosure. A control fluid stream deflects and directs the power fluid stream across consecutively a plurality of outlets to produce an output fluid pulse at each outlet. When the power stream is directed into the last outlet, a feedback fluid pulse is produced to switch off both the power stream and the control stream, thereby terminating the production of a pulse train of fluid signals. Means are provided to control the momentum of the control stream to control the rate of deflection of the power stream. Thus the pulse and repetition rate of the output fluid pulses may be controlled.

Further objects will become apparent upon reading the following specification together with the accompanying drawings in which:

FIG. 1 illustrates an embodiment of the present invention adapted to produce fluid pulses.

Referring now to FIG. 1, the pulse generating system comprises two fluid amplifiers 10 and 12, a pulse output chamber 14 and a pulse control chamber 16. Fluid supply means 17 and fluid pressure regulating means 19 provide fluid for the various devices within the system.

The amplifiers 10 and 12 may be any one of the several types of fluid amplifiers known in the art. Such amplifiers, for example, may be of a planar form, constructed from one or more laminae. A centrally disposed lamina may include a cut-out configuration with suitable ducts. The top and bottom of the central lamina may be covered with solid plates. The ducts within the central lamina may be adapted to be connected to pipes or other suitable fluid conducting means. For an example of a conventional type fluid amplifier and a description of the operation of such amplifiers, reference may be had to an article on page 15ff in the April 1960 issue of "Automatic Control," published by Reinhold Publishing Co.

Amplifier 10 includes a power stream inlet 18, two control signal inlets 20 and 22, a fluid return outlet 24 and a signal outlet 26. The power stream inlet 18 is connected to a pressure regulator 19 by means of fluid duct 28. Regulator 19 is also connected via a duct 34 to a compressor 17. The compressor 17 supplies the entire system with fluid at the required pressure.

The power stream is applied continuously to the amplifier 10 through the inlet 18. The configuration of the ducts within the amplifier 10 is designed so that with no control signal applied through either inlets 20 or 22, the power stream leaves the amplifier via the return outlet 24. The power stream is then returned to the compressor 17 by way of duct 27. The signal outlet 26 of the amplifier 10 is connected via duct 29 to the inlet 36 of the pulse output chamber 14.

Amplifier 12 includes a power stream inlet 38, two control signal inlets 40 and 42, a fluid return outlet 44 and a signal outlet 46. The power stream inlet 38 is connected to the compressor 17 by means of fluid duct 48, the pressure regulator 19 and the duct 34. The power stream is applied continuously to the amplifier 12. The open configuration within the amplifier is such that if no control signal is applied to either inlet 40 or 42, the power stream leaves the amplifier via the return outlet 44 and returns to the compressor by way of duct 50. The signal output duct 46 of the amplifier 12 is connected to an inlet 52 of the pulse control chamber 16.

The pulse output chamber 14 may also be of planar construction and assembled in like manner as discussed in connection with amplifiers 10 and 12. The cut-out figuration of the pulse output chamber comprises a power stream inlet 36, a control inlet 54, an enclosure 56 and a plurality of outlet ducts 58, 60, 62 and 64.

Outlet duct 58 is a fluid return duct connected to the compressor 17 via duct 66. Outlet ducts 60, 62 and 64 are provided with ducts or other fluid conducting means 68, 70 and 72, respectively, connecting the outlet ducts to suitable utilization devices (not illustrated). Such utilization devices may include other fluid devices or other devices adapted to control electrical circuits, for example. Fluid duct 72 is branched off into duct 74, which is connected to control signal inlet 20 of amplifier 10. A branch duct 76 of duct 74 is connected to control signal inlet 40 of amplifier 12.

The pulse control chamber 16 comprises a cylindrical enclosure 78 provided with a slidable piston 80. The cylindrical enclosure 78 communicates with the inlet 52 which is connected via duct 47 to the signal outlet duct 46 of amplifier 12. The enclosure 78 is further provided with an outlet 82 which is connected by means of duct 84 to the inlet 54 of the pulse output chamber 14. By positioning the piston 80 at different levels within the enclosure 78, the volume of the enclosure may be adjusted at a certain desired value. Means for positioning such a piston are well known and not illustrated or described.

The operation of the system comprising the elements described is as follows:

As explained above, when no control signal is applied to either amplifier 10 and 12, the power stream will pass through the amplifiers and return to the compressor. The power stream entering amplifier 10 at input 18 will leave via outlet 24 and return to compressor 17 via duct 27. The power stream entering amplifier 12 at inlet 38 will leave via outlet 44 and return to compressor 17 via duct 50.

If a control signal is applied to inlet 22 of the amplifier 10, the power stream is switched to outlet 26 and is led into pulse output chamber 14 via duct 29 and inlet 36. The power stream, indicated by arrow 31 within the enclosure 56, travels undisturbed through the pulse output chamber to outlet duct 58. From the outlet duct 58, the power stream is returned to the compressor 17 via duct 66. No output pulses are produced during the initial phase of operation.

If now a control signal is applied to the control signal input 42 of the amplifier 12, the power stream is switched to outlet 46 and led into the pulse control chamber 16 via duct 47 and inlet 52. As a result of the power stream entering the control chamber 16, the pressure of the fluid within the enclosure 78 increases. The rate at which the pressure increases is dependent on the volume of the enclosure 78, which in turn is determined by the position of piston 80 within the enclosure.

The momentum at which the fluid stream leaves the control chamber via outlet 82 into the pulse output chamber 14 is dependent upon the pressure developed within the enclosure 38. The fluid stream arriving from the control chamber 16, to be referred to as the pulse control stream, and enters into the pulse output chamber at right angles to the power stream 31. The impingement of the pulse control stream with the power stream causes a deviation of the trajectory of the power stream. The principle involved to cause this is that of momentum exchange, since the pulse control stream imparts momentum to the power stream. This causes the deviating power stream to consecutively scan the outlets 60, 62 and 64 to produce a fluid pulse at each outlet. The power stream in its consecutive deflected or deviated conditions is illustrated by the dotted lines and arrows 31a, 31b, and 31c.

The pulse produced by power stream 31c at outlet 64 is simultaneously transmitted to amplifier 10 via duct 74 to amplifier 12 via ducts 74 and 76. A fluid pulse arriving at control inlet 20 of amplifier 10 switches the amplifier back to its original state and the power stream exits through the return duct 27. It is seen, therefore, that the power stream 31 travelling through the pulse output chamber 14 is terminated.

The pulse arriving at control inlet 40 of amplifier 12, switches the amplifier back to its original state and the power stream exits through the return duct 50. As a result of this operation, the pressure in enclosure 78 of the pulse control chamber 16 drops. The pulse control stream supplied to the pulse output chamber is thereby terminated. The system is now ready for another cycle of operation.

By applying fluid control signals to control inlets 22 and 42 of amplifiers 10 and 12, respectively, the new cycle of operation as described may be repeated.

One of the main features of the present invention is related to the pulse output chamber 14. Effectively, a source of power fluid is caused to scan across the plurality of outlets 58, 60, 62 and 64 to produce a series of output fluid pulses. Upon reaching the last outlet 64, the power fluid is caused to be returned to the outlet 58 ready to commence another scanning operation, if desired. The speed of the scanning operation, and consequently the duration of the output pulses, is controlled by the pulse control chamber 16.

While the novel features of the invention as applied to a preferred embodiment have been shown and described, it will be understood that various omissions and substitutions of the devices illustrated and modifications as to their form may be made by those skilled in the art without departing from the scope of the invention. For example, it will be understood that the pulse output chamber, being illustrated as having only three pulse outlets, may have a different number of outlets. It will also be understood that each outlet is not necessarily connected individually to different work locations, but that a number of outlets may be combined into one common outlet so that a sequency of pulses is produced at this one common outlet.

What I claim is:

1. A fluid system comprising a chamber having a plurality of outlets, a source of fluid providing a power stream directed towards said outlets, each of said outlets being disposed to receive said fluid in succession as said power stream is deflected past said plurality of outlets, control means for deflecting said fluid across said plurality of outlets, and means associated with one of said outlets responsive to said fluid to terminate said power stream.

2. A fluid system comprising a chamber, a plurality of outlets associated with said chamber, means for directing a source of power fluid into said chamber, means for directing a source of control fluid into said chamber to selectively deflect said power fluid across said plurality of outlets, each of said outlets being disposed to receive said power fluid in succession as said power fluid is deflected past said plurality of fluids, and means associated with said one outlet to terminate said control fluid when said one outlet receives said power fluid.

3. A fluid system as set forth in claim 2 wherein said plurality of outlets are in substantial alignment with respect to each other and said power fluid is caused by said control fluid to scan said plurality of outlets to produce a series of fluid pulses at said outlets.

4. A fluid pulse generating system comprising; a chamber having a plurality of outputs, first means for applying power fluid to said chamber, second means for applying control fluid from a first source to said chamber deflecting said power fluid past each of said plurality of outputs in succession to produce fluid pulses at said plurality of outputs, third means for applying control fluid from a second source to said second means, said power fluid at said first means being responsive to one of said pulses at said plurality of outputs, said second means being responsive to one of said pulses at said plurality of outputs.

5. A fluid pulse generating system as set forth in claim 4, wherein said first means and said third means each comprise a fluid amplifier.

6. A fluid pulse generating system as set forth in claim 5, wherein said second means comprises a control chamber and fourth means are associated with said control chamber, said fourth means being adapted to selectively vary the volume of said chamber.

7. A fluid pulse generating system as set forth in claim 6, wherein said fourth means includes a piston movable within said chamber.

8. A fluid pulse generating system comprising a pulse output chamber having a first inlet, a second inlet adjacent said first inlet and a plurality of outlets disposed opposite to said first inlet, first means for selectively applying power fluid to said pulse output chamber at said first inlet, second means for applying control fluid to said pulse output chamber at said second inlet for deflecting said power fluid past each of said plurality of outlets to provide a fluid pulse at each of said plurality of outlets during each deflection, third means for selectively applying control fluid to said second means, means associated with one of said plurality of outlets to terminate said power fluid after each full deflection of said power stream.

9. A fluid pulse generating system comprising a pulse output chamber having a first inlet, a second inlet adjacent said first inlet, a plurality of outlets disposed opposite said first inlet and being in alignment, first means adapted to selectively apply power fluid to said pulse output chamber at said first inlet providing a power stream directed at the first of said plurality of outlets, second means adapted to apply control fluid to said pulse output chamber at said second inlet to cause said power stream to sweep past each of said plurality of outlets in succession, third means adapted to selectively apply control fluid to said second means, one of said plurality of outlets being connected to said first and second means for automatically terminating said power fluid and control fluid in response to a fluid pulse in said one of said plurality of outlets formed when said power stream is swept past said one of said plurality of outlets.

10. A fluid pulse generating system comprising a pulse output chamber having a first inlet, a second inlet adjacent said first inlet and a plurality of outlets, a first fluid amplifier adapted to selectively apply power fluid to said pulse output chamber at said first inlet, said first amplifier having at least one control fluid inlet, means adapted to apply control fluid to said pulse output chamber at said second inlet, a second fluid amplifier adapted to selectively apply control fluid to said means, said second amplifier having at least one control fluid inlet, said power fluid being responsive to said control fluid from said means at said second inlet to produce fluid pulses at said plurality of outlets.

11. A fluid pulse generating system as set forth in claim 8 wherein said pulse output chamber comprises a substantially rectangular chamber, said first and second inlets being disposed at one corner of said chamber, said first and said second inlets being directed at substantially right angles with respect to each other, and said plurality of outlets being disposed along a wall of said chamber facing said first inlet.

12. A fluid pulse generating system as set forth in claim 9, wherein the last outlet of said plurality of outlets is connected to said control fluid inlet of said first amplifier and to said control fluid inlet of said second amplifier.

References Cited by the Examiner
UNITED STATES PATENTS

| | | | |
|---|---|---|---|
| 3,001,539 | 9/61 | Hurvitz | 137—83 |
| 3,024,805 | 3/62 | Horton | 137—597 |
| 3,075,548 | 1/63 | Horton | 137—83 |

LAVERNE D. GEIGER, *Primary Examiner.*

M. CARY NELSON, *Examiner.*